(12) United States Patent
Amiri et al.

(10) Patent No.: US 8,547,901 B2
(45) Date of Patent: Oct. 1, 2013

(54) METHOD AND APPARATUS FOR ORDERED PARTIAL DETECTION WITH MIMO COOPERATION

(75) Inventors: Kiarash Amiri, Houston, TX (US); Michael Wu, Palo Alto, CA (US); Joseph R. Cavallaro, Pearland, TX (US); Jorma Olavi Lilleberg, Oulu (FI)

(73) Assignee: Nokia Corporation, Espoo (FI)

( * ) Notice: Subject to any disclaimer, the term of this patent is extended or adjusted under 35 U.S.C. 154(b) by 482 days.

(21) Appl. No.: 12/716,252

(22) Filed: Mar. 2, 2010

(65) Prior Publication Data
US 2011/0216693 A1    Sep. 8, 2011

(51) Int. Cl.
*H04W 4/00*     (2009.01)
*H04W 72/00*    (2009.01)
*H04J 11/00*    (2006.01)
*H04B 1/00*     (2006.01)

(52) U.S. Cl.
USPC ........... 370/328; 370/203; 370/208; 370/252; 370/294; 370/342; 455/69; 455/428; 455/452.2; 455/562.1

(58) Field of Classification Search
USPC .......................... 370/328–463; 455/428–455
See application file for complete search history.

(56) References Cited

U.S. PATENT DOCUMENTS

| | | | |
|---|---|---|---|
| 7,079,480 B2 * | 7/2006 | Agee | 370/204 |
| 7,248,841 B2 * | 7/2007 | Agee et al. | 455/101 |
| 7,428,269 B2 * | 9/2008 | Sampath et al. | 375/267 |
| 7,436,896 B2 * | 10/2008 | Hottinen et al. | 375/267 |
| 7,502,421 B2 * | 3/2009 | Hottinen et al. | 375/267 |
| 7,664,061 B2 * | 2/2010 | Hottinen | 370/310 |
| 7,917,176 B2 * | 3/2011 | Khojastepour et al. | 455/562.1 |
| 7,920,501 B2 * | 4/2011 | Larsson et al. | 370/315 |
| 8,005,033 B2 * | 8/2011 | Li et al. | 370/315 |
| 8,040,856 B2 * | 10/2011 | Xia et al. | 370/335 |
| 8,086,242 B2 * | 12/2011 | Kent et al. | 455/452.2 |
| 8,116,391 B2 * | 2/2012 | Mielczarek et al. | 375/260 |
| 8,126,487 B2 * | 2/2012 | Lee et al. | 455/501 |

(Continued)

FOREIGN PATENT DOCUMENTS

WO    2010-016831 A1    2/2010

OTHER PUBLICATIONS

Burg, Andreas, et al., "VLSI Implementation of MIMO Detection Using the Sphere Decoding Algorithm", IEEE Journal of Solid-State Circuits, vol. 40, No. 7, Jul. 2005, pp. 1566-1577.

(Continued)

*Primary Examiner* — Ayaz Sheikh
*Assistant Examiner* — Venkatesh Haliyur
(74) *Attorney, Agent, or Firm* — Mintz, Levin, Cohn, Ferris, Glovsky & Popeo, P.C.

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: receiving a MIMO (multiple-input multiple output) encoded symbol vector, the symbol vector encoding a plurality of streams of a source node; estimating channel matrix between the source node and the apparatus; re-ordering columns in said channel matrix; determining a plurality of feedback bits based at least in part on the re-ordered channel matrix, wherein each bit of the feedback bits indicates detection or no detection of the corresponding antenna streams of the source node; and transmitting the feedback bits.

15 Claims, 4 Drawing Sheets

(56) References Cited

U.S. PATENT DOCUMENTS

| | | | |
|---|---|---|---|
| 8,179,775 B2* | 5/2012 | Chen et al. | 370/203 |
| 8,184,801 B1* | 5/2012 | Hamalainen | 379/406.03 |
| 8,195,184 B2* | 6/2012 | Kent et al. | 455/452.2 |
| 8,244,190 B2* | 8/2012 | Larsson et al. | 455/78 |
| 8,259,836 B2* | 9/2012 | Xia et al. | 375/267 |
| 8,265,177 B2* | 9/2012 | Xia et al. | 375/260 |
| 8,295,778 B2* | 10/2012 | Kotecha et al. | 455/69 |
| 8,300,616 B2* | 10/2012 | Tang | 370/342 |
| 8,300,665 B2* | 10/2012 | Chun et al. | 370/479 |
| 8,305,921 B2* | 11/2012 | Narasimhan et al. | 370/252 |
| 8,363,744 B2* | 1/2013 | Agee et al. | 375/267 |
| 2002/0150109 A1* | 10/2002 | Agee | 370/400 |
| 2004/0042427 A1* | 3/2004 | Hottinen | 370/335 |
| 2004/0082356 A1* | 4/2004 | Walton et al. | 455/522 |
| 2004/0095907 A1* | 5/2004 | Agee et al. | 370/334 |
| 2005/0078761 A1* | 4/2005 | Hottinen et al. | 375/267 |
| 2006/0276212 A1* | 12/2006 | Sampath et al. | 455/513 |
| 2007/0165739 A1* | 7/2007 | Hottinen et al. | 375/267 |
| 2008/0095281 A1* | 4/2008 | Hosur et al. | 375/347 |
| 2008/0233965 A1* | 9/2008 | Kent et al. | 455/450 |
| 2008/0268862 A1* | 10/2008 | Kent et al. | 455/452.2 |
| 2008/0285488 A1* | 11/2008 | Walton et al. | 370/280 |
| 2008/0285669 A1* | 11/2008 | Walton et al. | 375/260 |
| 2008/0285670 A1* | 11/2008 | Walton et al. | 375/260 |
| 2008/0298474 A1 | 12/2008 | Charbit et al. | |
| 2008/0304463 A1* | 12/2008 | Borkar et al. | 370/342 |
| 2008/0304464 A1* | 12/2008 | Borkar et al. | 370/342 |
| 2009/0046569 A1* | 2/2009 | Chen et al. | 370/203 |
| 2009/0154411 A1* | 6/2009 | Kikuchi et al. | 370/329 |
| 2009/0181691 A1* | 7/2009 | Kotecha et al. | 455/452.1 |
| 2009/0196214 A1* | 8/2009 | Li et al. | 370/315 |
| 2009/0268662 A1* | 10/2009 | Larsson et al. | 370/328 |
| 2010/0054212 A1* | 3/2010 | Tang | 370/335 |
| 2010/0254325 A1* | 10/2010 | Narasimhan et al. | 370/329 |
| 2010/0254446 A1* | 10/2010 | Khayrallah et al. | 375/232 |
| 2010/0266054 A1* | 10/2010 | Mielczarek et al. | 375/260 |
| 2010/0272005 A1* | 10/2010 | Larsson et al. | 370/315 |
| 2010/0317382 A1* | 12/2010 | Lee et al. | 455/501 |
| 2011/0150114 A1* | 6/2011 | Miao et al. | 375/260 |
| 2011/0206024 A1* | 8/2011 | Lee et al. | 370/338 |
| 2011/0216693 A1* | 9/2011 | Amiri et al. | 370/328 |

OTHER PUBLICATIONS

Cover, Thomas M., "Capacity Theorems for the Relay Channel", IEEE Transactions on Information Theory, vol. IT-25, No. 5, Sep. 1979, pp. 572-584.

Fincke, U., et al., "Improved Methods for Calculating Vectors of Short Length in a Lattice, Including a Complexity Analysis", Mathematics of Computation, vol. 44, No. 170, Apr. 1985, pp. 463-471.

Laneman, J. Nicholas, et al., "Cooperative Diversity in Wireless Networks: Efficient Protocols and Outage Behavior", IEEE Trans. Info Theory, Jan. 2002, pp. 1-54.

Sendonaris, Andrew, et al., "User Cooperation Diversity—Part I: System Description", IEEE Transactions on Communications, vol. 51, No. 11, Nov. 2003, pp. 1927-1938.

Telatar, I. Emre, "Capacity of Multi-Antenna Gaussian Channels", Europ. Trans. Telecom, Nov. 1999, pp. 1-28.

Wang, Bo, et al., "On the Capacity of MIMO Relay Channels", IEEE Trans. on Info Theory, 2005, pp. 1-31.

Wubben, D., "Efficient Algorithm for Decoding Layered Space-Time Codes", Electronics Letters, vol. 37, No. 22, Oct. 25, 2001, pp. 1348-1350.

E.C. van der Meulen, "Transmission of information in a T-terminal discrete memoryless channel", PhD Thesis, University of California Berkeley, CA, Jun. 1968.

* cited by examiner

TIME SLOT 1

RELAY DETECTS:
$X_r = [\tilde{x}_1, ..., \tilde{x}_{ef}, -]$

SOURCE TRANSMITS:
$X_s = [x_1, ..., x_{Ms}]$

TIME SLOT 2    RELAY TRANSMITS:
$X_r = [\tilde{x}_1, ..., \tilde{x}_{ef}, -]$

US 8,547,901 B2

METHOD AND APPARATUS FOR ORDERED PARTIAL DETECTION WITH MIMO COOPERATION

TECHNICAL FIELD

The present application relates generally to relay system with Multiple-input multiple-output (MIMO) cooperation.

BACKGROUND

As wireless communication devices flourish, there is a need for higher data rates and spectral efficiency. Multiple-input multiple-output (MIMO) systems can provide higher data rates and spectral efficiencies in wireless communications systems, and have been playing a significant role in a wide variety of wireless standards.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: receiving a MIMO (multiple-input multiple output) encoded symbol vector, the symbol vector encoding a plurality of streams of a source node; estimating channel matrix between the source node and the apparatus; re-ordering columns in said channel matrix; determining a plurality of feedback bits based at least in part on the re-ordered channel matrix, wherein each bit of the feedback bits indicates detection or no detection of the corresponding antenna streams of the source node; and transmitting the feedback bits.

According to a second aspect of the present invention, a method comprising: receiving a MIMO (multiple-input multiple output) encoded symbol vector, the symbol vector encoding a plurality of streams of a source node; estimating channel matrix between the source node and the apparatus; re-ordering columns in said channel matrix; determining a plurality of feedback bits based at least in part on the re-ordered channel matrix, wherein each bit of the feedback bits indicates detection or no detection of the corresponding antenna streams of the source node; and transmitting the feedback bits.

According to a third aspect of the present invention, a computer program product comprising: a computer-readable medium bearing computer program code embodied therein for use with a computer, the computer program code comprising: code for receiving a MIMO (multiple-input multiple output) encoded symbol vector, the symbol vector encoding a plurality of streams of a source node; code for estimating channel matrix between the source node and the apparatus; code for re-ordering columns in said channel matrix; code for determining a plurality of feedback bits based at least in part on the re-ordered channel matrix, wherein each bit of the feedback bits indicates detection or no detection of the corresponding antenna streams of the source node; and code for transmitting the feedback bits.

According to a fourth aspect of the present invention, an apparatus comprising: at least one processor; and at least one memory including computer program code, wherein the at least one memory and the computer program code are configured to, with the at least one processor, cause the apparatus to perform at least the following: receiving a MIMO (multiple-input multiple output) encoded symbol vector, the symbol vector encoding a plurality of streams of a source node; receiving a plurality of feedback bits which indicate detection or no detection of the corresponding antenna streams of the source node; detecting the received symbol vector for the streams where the feedback bits indicate detection; and transmitting the detected symbol vector.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings.

Figure 1:
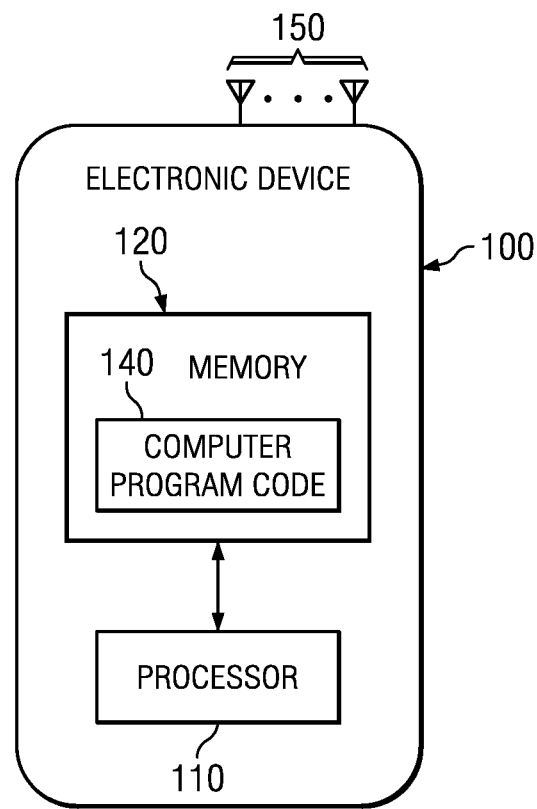
FIG. 1 is a block diagram depicting an electronic device operating in accordance with an example embodiment of the invention.

FIG. 1 is a block diagram depicting an electronic device 100 operating in accordance with an example embodiment of the invention. In an example embodiment, the electronic device 100 comprises a processor 110 or other processing component. In an example embodiment, the electronic device 100 may comprise multiple processors, such as processor 110.

In an embodiment, the electronic device 100 comprises memory 120. For example, the electronic device may comprise volatile memory, such as random access memory (RAM). Volatile memory may comprise a cache area for the temporary storage of data. Further, the electronic device 100 may also comprise non-volatile memory, which may be embedded and/or may be removable. The non-volatile memory may also comprise an electrically erasable programmable read only memory, flash memory, and/or the like. In an alternative embodiment, the processor 110 may comprise memory. For example, the processor 110 may comprise volatile memory, non-volatile memory, and/or the like.

The electronic device 100 may use at least one memory to store one or more computer program code 140. In accordance with computer program code 140, the processor 110 may perform embodiments of the present invention.

The electronic device 100 may communicate over a radio link to a wireless network using one or a plurality of antennas. The electronic device 100 may have one or a plurality of antennas 150. Such antennas may be separated into receive-only antennas, transmit-only antennas, or transmit/receive antennas.

In an embodiment, the processor 110 of the electronic device 100 may comprise circuitry for implementing audio feature, logic features, and/or the like. For example, the processor 110 may comprise a digital signal processor device, a microprocessor device, a digital to analog converter, other support circuits, and/or the like. In an embodiment, control and signal processing features of the processor 110 may be allocated between devices, such as the devices describe above, according to their respective capabilities. Further, the processor 110 may also comprise an internal voice coder and/or an internal data modem. Further still, the processor 110 may comprise features to operate one or more software programs. For example, the processor 110 may be capable of operating a software program for connectivity, such as a conventional Internet browser. Further, the connectivity program may allow the electronic device 100 to transmit and receive Internet content, such as location-based content, other web page content, and/or the like. In an embodiment, the electronic device 100 may use a wireless application protocol (WAP), hypertext transfer protocol (HTTP), file transfer protocol (FTP) and/or the like to transmit and/or receive the Internet content.

In an embodiment, the electronic device 100 may be capable of operating in accordance with any of a number of a first generation communication protocol, a second generation communication protocol, a third generation communication protocol, a fourth generation communication protocol, and/or the like. For example, the electronic device 100 may be capable of operating in accordance with second generation (2G) communication protocols IS-136, time division multiple access (TDMA), global system for mobile communication (GSM), IS-95 code division multiple access (CDMA), and/or the like. Further, the electronic device 100 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the electronic device 100 may also be capable of operating in accordance with 3.9 generation (3.9G) wireless communication protocols, such as Evolved Universal Terrestrial Radio Access Network (E-UTRAN) or the like, or wireless communication projects, such as long term evolution (LTE) or the like. Still further, the electronic device 100 may be capable of operating in accordance with fourth generation (4G) communication protocols.

In an alternative embodiment, the electronic device 100 may be capable of operating in accordance with a non-cellular communication mechanism. For example, the electronic device 100 may be capable of communication in a wireless local area network (WLAN), other communication networks, and/or the like. Further, the electronic device 100 may communicate in accordance with techniques, such as radio frequency (RF), infrared (IrDA), any of a number of WLAN techniques. For example, the electronic device 100 may communicate using one or more of the following WLAN techniques: IEEE 802.11, e.g., 802.11a, 802.11b, 802.11g, 802.11n, and/or the like. Further, the electronic device 100 may also communicate, via a world interoperability, to use a microwave access (WiMAX) technique, such as IEEE 802.16, and/or a wireless personal area network (WPAN) technique, such as IEEE 802.15, BlueTooth (BT), ultra wideband (UWB), and/or the like.

It should be understood that the communications protocols described above may employ the use of signals. In an example embodiment, the signals comprises signaling information in accordance with the air interface standard of the applicable cellular system, user speech, received data, user generated data, and/or the like. In an embodiment, the electronic device 100 may be capable of operating with one or more air interface standards, communication protocols, modulation types, access types, and/or the like. It should be further understood that the electronic device 100 is merely illustrative of one type of electronic device that would benefit from embodiments of the invention and, therefore, should not be taken to limit the scope of embodiments of the invention.

While embodiments of the electronic device 100 are illustrated and will be hereinafter described for purposes of example, other types of electronic devices, such as a portable digital assistant (PDA), a pager, a mobile television, a gaming device, a camera, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by the electronic device 100, embodiments may also be employed by a server, a service, a combination thereof, and/or the like.

Figure 2:
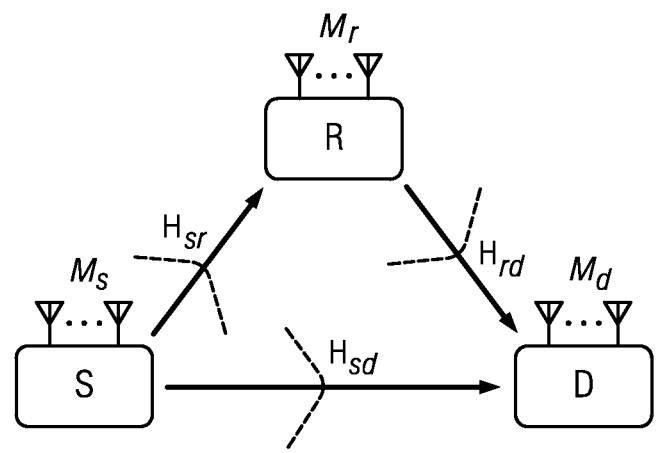
FIG. 2 is a block diagram illustrating a wireless relay network operating in accordance with an example embodiment of the invention.

FIG. 2 is a block diagram illustrating a wireless relay network operating in accordance with an example embodiment of the invention. FIG. 2 illustrates an example relay network with three nodes: source S, relay R and destination D. The source node S transmits a MIMO encoded message, which is received by both the relay node R and the destination node D. In this example, the source S, relay R and destination D are equipped with Ms, Mr and Md antennas respectively.

As illustrated in FIG. 2, the channel matrices between the source S and the relay R, the relay R and the destination D, and the source S and the destination D are denoted respectively by Hsr, Hrd and Hsd. The sizes of channel matrices Hsr, Hrd and Hsd are Mr×Ms, Md×Mr and Md×Ms, respectively.

In accordance with cooperative MIMO transmissions, the relay R will decode the received MIMO message, and then re-encode and re-transmit the MIMO message to the destination D.

In this scenario, the Hsr matrix is known in the relay R; and Hsd and Hrd matrices are known in the destination D. Therefore, the receivers of each communication link have complete channel knowledge, with the exception that the destination D is not aware of the ordering of the Hsr column norms in the relay R. The ordering information may assist the destination D to restore the detected streams to their original order. The norms of the channel matrix may change at a slower rate than the actual channel coefficients, and requires smaller number of bits. Thus, the ordering information can be communicated from the relay R to the destination D through a low rate control channel.

An embodiment of the present invention allows the relay R to perform a partial decoding of channel matrix Hsr and provide the partial decoding to destination D. The communication between the source S and the destination D is performed in two time slots. In the first time slot, the source S broadcasts its message to both the relay R and the destination D; and in the second time slot, the relay R transmits its message to the destination D while the source S is silent. The relay R may use M≤Mr subset of its antennas for the transmission.

Figure 3A:
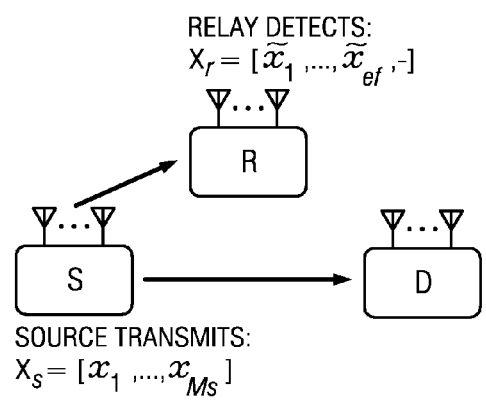
FIG. 3a is a block diagram illustrating a first data transmission between nodes operating in accordance with an example embodiment of the invention.
Figure 3B:
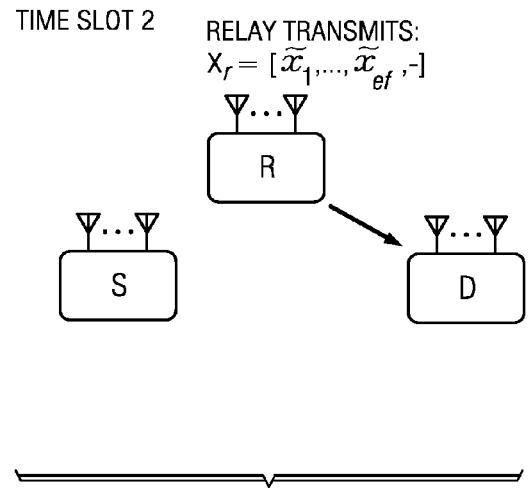
FIG. 3b is a block diagram illustrating a second data transmission between nodes operating in accordance with an example embodiment of the invention.

More details regarding this embodiment are shown in FIG. 3a and FIG. 3b. In the first time slot, as shown in FIG. 3a, the relay R and destination D each receive a copy of the source multi-stream data, wherein each stream of data corresponds to the data from each antenna of source S. The source multi-stream data is represented as symbol vector $x_s=[x_1, \ldots, x_{Ms}]$, which encodes a plurality of streams of the source S, where $x_1$ is the encoded symbol from antenna 1 and $x_{Ms}$ is the encoded symbol from antenna Ms. The relay R detects part of the transmitted message, the detected part of the transmitted message is referred to as vector xr and will be discuss in further detail in description of FIG. 5. The destination D also detects the transmitted message, further detail will be discussed in description of FIG. 4.

In the second time slot the relay R transmits the detected vector xr to the destination D, as illustrated in FIG. 3b. The destination D detects the vector received from the relay R, and then combines with the detected vector received from source S during the first time slot. This process will be described in further detail below.

Figure 4:
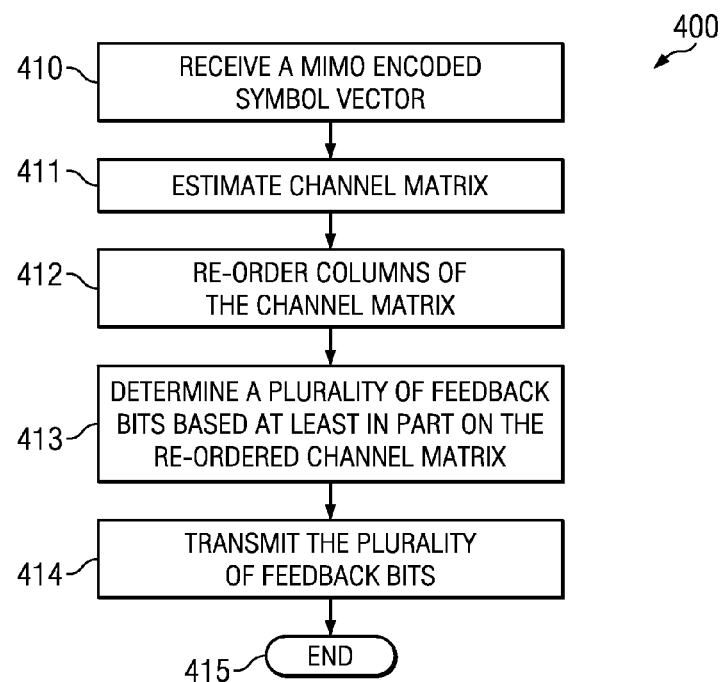
FIG. 4 is a flow diagram illustrating an example method for receiving and processing multi-stream data in accordance with an example embodiment of the invention.

FIG. 4 is a flow diagram illustrating an example method for receiving and processing the multi-stream data as performed by the destination D in accordance with an example embodiment of the invention. Example method 400 may be performed by an electronic device, such as electronic device 100 of FIG. 1.

At block 410, the destination node D receives a MIMO encoded symbol vector from the source S.

At block 411, the destination D estimates the channel matrix Hsd between the source S and the destination D. In an example embodiment, the channel matrix estimation is based on pilot channel or reference symbols. The pilot channel or reference symbols assisted channel estimation is merely illustrative of one type of technique that may be used to estimate the channel matrix and, therefore, should not be taken to limit the scope of embodiments of the invention.

At block 412, the destination D re-orders the columns of channel matrix Hsd. Let P denote the re-ordered channel matrix. In an example embodiment, the first column of the matrix, P(1), has the weakest effective Signal-Noise-Ratio (SNR), and the last column of the matrix, P(Ms), has the highest effective SNR. Various techniques may be used to re-order the columns of channel matrix Hsd. In an example embodiment, a sorted QR decomposition is used to perform the re-ordering, where Q is a unitary matrix, R is an upper triangle matrix and Hsd=Q·R. The sorted QR decomposition uses Gram-Schmidt method for QR decomposition. In addition, it exchanges the columns according to the column norms in every step of the Gram-Schmidt method. In another example embodiment, the V-BLAST ordering may be used to perform the re-ordering. The sorted QR decomposition and V-BLAST are merely illustrative of two types of re-ordering techniques that may be used to reorder the columns of the channel matrix and, therefore, should not be taken to limit the scope of embodiments of the invention.

At block 413, the destination D determines the values of a plurality of feedback bits based at least in part on the re-ordered channel matrix. In an example embodiment, values of feedback bits for each antenna of the source S are determined. In this example embodiment the number of feedback bits equals to Ms, which is the number of transmit antennas in source S. In an example embodiment, a predefined number of the re-ordered columns with the weakest SNR are selected, and the feedback bits for the selected columns are set to indicate detection of the corresponding antenna streams from the source node, while the feedback bits for the rest of the re-ordered columns are set to no detection of the corresponding antenna streams from the source node. In an example embodiment, a value of 1 indicates that the SNR from the corresponding antenna is among a predetermined number of the weakest SNRs from source S. In an example embodiment, a value of 0 indicates that the SNR from the corresponding antenna is not among a predetermined number of the weakest SNRs from source S.

For example, for a scenario where Ms is 4 and a predefined number of the re-ordered columns with the weakest SNR is 2, when the weakest SNR are from antenna 1 and 3, the feedback bits may be set to [1010], where bit value 1 indicates detection and 0 indicates no detection. The setting of feedback bits is merely illustrative of one type of settings that operates in accordance with embodiments of the invention and, therefore, should not be taken to limit the scope of embodiments of the invention. For example, the feedback bits may be coupled with other control information transmitted from the destination D.

At block 414, the destination D transmits the plurality of feedback bits to relay R. The example method 400 ends.

Figure 5:
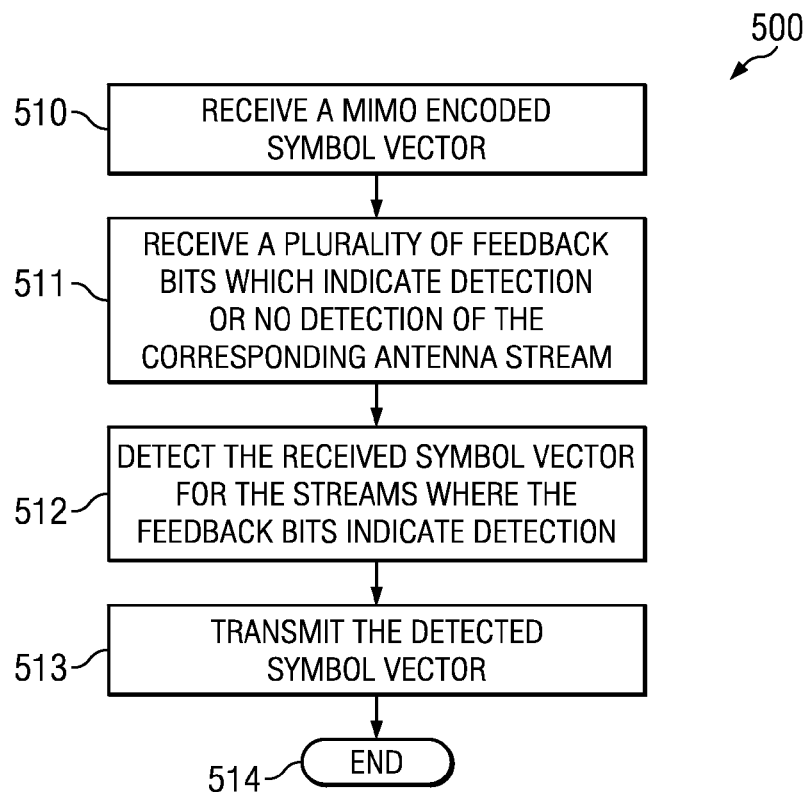
FIG. 5 is a flow diagram illustrating an example method for receiving and processing multi-stream data in accordance with another example embodiment of the invention.

FIG. 5 is a flow diagram illustrating an example method for receiving and processing the multi-stream data as performed by the relay R in accordance with an example embodiment of the invention. Example method 500 may be performed by an electronic device, such as electronic device 100 of FIG. 1.

At block 510, the relay R receives a MIMO encoded symbol vector from the source S.

At block 511, the relay R receives a plurality of feedback bits transmitted from the destination D. In an example embodiment, relay R receives the plurality of feedback bits transmitted from destination D at block 414 of FIG. 4. In an example embodiment, the plurality of feedback bits indicates detection or no detection of the corresponding antenna streams from source S.

At block 512, the relay R detects the received encoded symbol vector for the streams where the feedback bits indicate detection. In an example embodiment, if a feedback bit indicates detection of the corresponding stream from an antenna in the source node, the relay R performs detection for the antenna stream. In an example embodiment, if a feedback bit indicates no detection of the corresponding stream from an antenna in the source node, the relay R does not perform detection for the antenna stream. If the number of feedback bits which indicate detection of the corresponding antenna streams is denoted as ef, then the detected symbol vector can be represented as $x_r=[x_1, \ldots, X_{ef}]$. For example, for a scenario where source S is equipped with four transmit antennas (Ms=4), when the received feedback bits are [1010], wherein bit value 1 indicates detection and 0 indicates no detection, the relay R performs detection for antenna 1 and 3, while the relay R does not perform detection for antenna 2 and 4. Because the relay R does not perform detection for the streams where the feedback bits indicate no detection, the computation may be reduced compared with the scenario that the relay R performs detection for all antenna streams.

At block 513, the relay R transmits the detected symbol vector xr to destination D. In the example above, the relay R transmits the detected symbols for antennas 1 and 3 of source S to destination D. The example method 500 ends.

Figure 6:
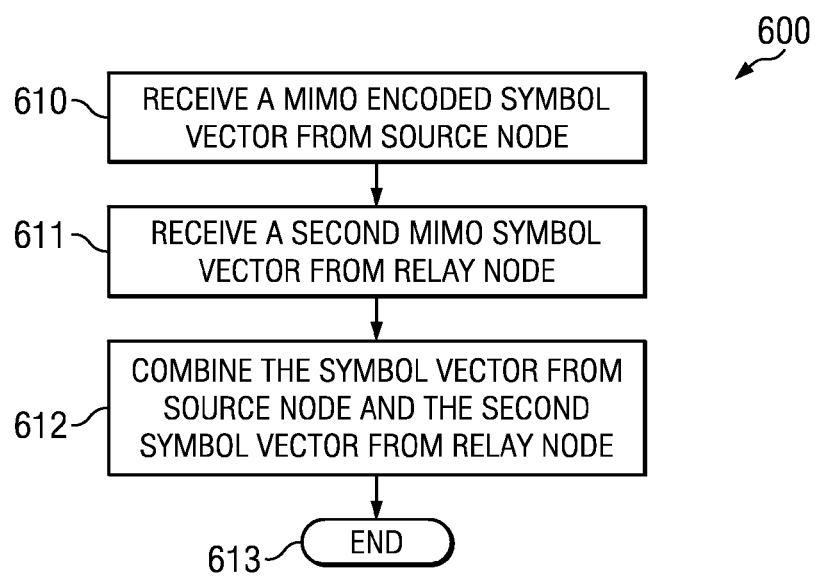
FIG. 6 is a flow diagram illustrating an example method for combining two multi-stream data in accordance with an example embodiment of the invention.

FIG. 6 is a flow diagram illustrating an example method for combining the two multi-stream data from source S and the relay R as performed by the destination D in accordance with an example embodiment of the invention. Example method 600 may be performed by an electronic device, such as electronic device 100 of FIG. 1.

At block 610, the destination D receives a MIMO encoded symbol vector from source S.

At block 611, the destination D receives a second MIMO symbol vector from relay R. In an example embodiment, destination D receives the MIMO symbol vector transmitted from relay R at block 513 of FIG. 5.

At block 612, the destination D combines the received symbol vector from source S and the received second symbol vector from relay R. In an example embodiment, the feedback bits are set to detection for a predefined number of antennas with the weakest SNR of source S. In this example embodiment, the relay R re-transmits the data for the predefined number of antennas with the weakest SNR to destination D. With the multiple copies of data, the probabilities of correctly decoding the original data may be enhanced at the destination D. In an example embodiment, the destination D employs Maximum Radio Combining (MRC). The MRC is merely illustrative of one type of technique that may be used to perform combining and, therefore, should not be taken to limit the scope of embodiments of the invention. The example method 600 ends.

Figure 7:
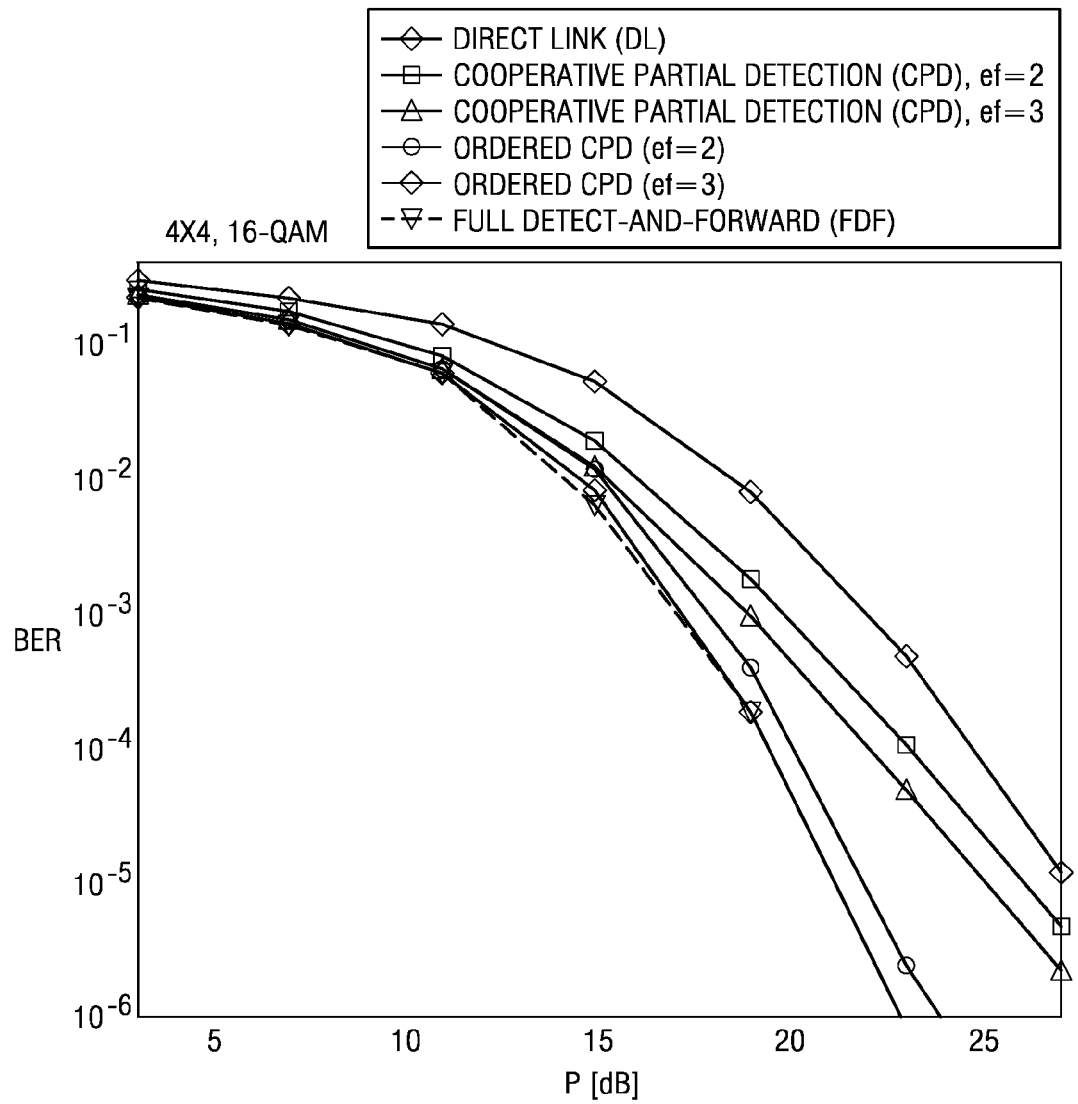
FIG. 7 is a chart illustrating the Bit Error Rate (BER) for a 16-QAM (Quadrature Amplitude Modulation) system with 4 antennas in accordance with an example embodiment of the invention.

FIG. 7 is a chart of Bit Error Rate (BER) of an embodiment compared to a direct link method and a full detect-and-forward method. In the direct link method, no relay is used. In the full detect-and-forward method, all streams from the source node are detected and forwarded to the destination by the relay node. The simulation utilized a 4×4 antennas and 16-QAM system. Different ratio of power splitting is used for a proper comparison of processing power when comparing the different methods. The power splitting ratio for the cooperative partial detection $\mu_{cpd}$ is calculated as $$\mu_{cpd} = 1 - (1 - \mu_{fdf}) \cdot \frac{ef}{M_s}$$

where $\mu_{fdf}$ is the power splitting ratio for full detect-and-forward case, ef is the number of weakest antennas and Ms is the number of transmit antennas from the source S. In FIG. 7, simulations for ef equals to 2 and 3 are performed; therefore, the relay detects and forwards 2 and 3 streams to the destination, respectively. The chart in FIG. 7 suggests both the cooperative scenarios improve the performance compared to the base direct link scenario. The improvement varies between 4 and 5 dB for high range of transmit power. Both the cooperative scenarios have close performance with full detect-and-forward method, the performance for ef=3 is almost identical to that of full detect-and-forward, while the performance for ef=2 is within 1 dB from that of full detect-and-forward.

Although the embodiments have been described in terms of one relay, other embodiments may include multiple cooperative relays working between the source S and the destination D.

Without in any way limiting the scope, interpretation, or application of the claims appearing below, a technical effect of one or more of the example embodiments disclosed herein may be enabling partial detection at a relay node and therefore reduce computations at the relay node. Another technical effect of one or more of the example embodiments disclosed herein may be enabling the destination node to improve the probabilities of correctly decoding the original data at the destination node by combining multiple copies of data from source node and relay node.

Embodiments of the present invention may be implemented in software, hardware, application logic or a combination of software, hardware and application logic. The software, application logic and/or hardware may reside on an electronic device or a personal key. If desired, part of the software, application logic and/or hardware may reside on an electronic device and part of the software, application logic and/or hardware may reside on a personal key. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor; and
at least one memory including computer program code,
wherein the at least one memory and the computer program code are configured to, with the at least one processor, cause the apparatus to perform at least the following:
receiving, at a first node, a multiple-input multiple output signal vector, the signal vector comprising a plurality of streams from a second node;
estimating, at the first node, a channel matrix representative of a channel between the second node and the first node, the channel matrix comprising a plurality of columns, wherein each of the plurality of columns represents one of the plurality of streams;
selecting, at the first node, based on a signal-to-noise ratio of each of the plurality of columns, a predetermined quantity of the plurality of columns, wherein for each selected column, a feedback bit is set to a first value to cause detection at a third node of the one of the plurality of streams sent from the second node; and
transmitting the feedback bits to the third node.

2. The apparatus of claim 1, wherein the at least one memory and the computer program code are configured to, with the at least one processor, cause the apparatus to further perform:
receiving a second multiple-input multiple output signal vector from the third node; and
combining the received signal vector from the second node and the received second signal vector from the third node.

3. The apparatus of claim 2, wherein the combining comprises maximal ratio combining.

4. The apparatus of claim 1, further comprising:
re-ordering, at the first node, one or more of the plurality of columns of the channel matrix according to the signal-to-noise ratio associated with each of the plurality of columns.

5. The apparatus of claim 4, wherein the re-ordering one or more of the plurality of columns of the channel matrix is based on at least a sorted QR decomposition, wherein Q is a unitary matrix, R is an upper triangle matrix, and the channel matrix is represented by a matrix multiplication of Q and R.

6. A method, comprising:
receiving, at a first node, a multiple-input multiple output signal vector, the signal vector comprising a plurality of streams from a second node;
estimating, at the first node, a channel matrix representative of a channel between the second node and the first node, the channel matrix comprising a plurality of columns, wherein each of the plurality of columns represents one of the plurality of streams;
selecting, at the first node, based on a signal-to-noise ratio of each of the plurality of columns, a predetermined quantity of the plurality of columns, wherein for each selected column, a feedback bit is set to a first value to cause detection at a third node of the one of the plurality of streams sent from the second node; and
transmitting the feedback bits to the third node.

7. The method of claim 6, further comprising:
receiving a second multiple-input multiple output signal vector from the third node; and
combining the received signal vector from the second node and the received second signal vector from the third node.

8. The method of claim 7, wherein the combining comprises maximal ratio combining.

9. The method of claim 6, further comprising:
re-ordering, at the first node, one or more of the plurality of columns of the channel matrix according to the signal-to-noise ratio associated with each of the plurality of columns.

10. The method of claim 9, wherein the re-ordering one or more of the plurality of columns of the channel matrix is based on at least a sorted QR decomposition, wherein Q is a unitary matrix, R is an upper triangle matrix, and the channel matrix is represented by a matrix multiplication of Q and R.

11. A non-transitory computer-readable medium comprising program code which when executed by a processor provide operations comprising:
receiving, at a first node, a multiple-input multiple output signal vector, the signal vector comprising a plurality of streams from a second node;
estimating, at the first node, a channel matrix representative of a channel between the second node and the first node, the channel matrix comprising a plurality of columns, wherein each of the plurality of columns represents one of the plurality of streams;
selecting, at the first node, based on the signal-to-noise ratio of each of the plurality of columns, a predetermined quantity of the plurality of columns, wherein for each selected column, a feedback bit is set to a first value to cause detection at a third node of the of one of the plurality of streams sent from the second node; and
transmitting the feedback bits to the third node.

12. The non-transitory computer readable medium of claim 11, further comprising:
receiving, at the first node, a second multiple-input multiple output signal vector from the third node; and
combining, at the first node, the received signal vector from the second node and the received second signal vector from the third node.

13. The non-transitory computer readable medium of claim 12, wherein the combining comprises maximal ratio combining.

14. The non-transitory computer readable medium of claim 11, further comprising:
re-ordering, at the first node, one or more of the plurality of columns of the channel matrix according to the signal-to-noise ratio associated with each of the plurality of columns.

15. The non-transitory computer readable medium of claim 14, wherein the re-ordering the one or more of the plurality of columns of the channel matrix is based on at least a sorted QR decomposition, wherein Q is a unitary matrix, R is an upper triangle matrix, and the channel matrix is represented by a matrix multiplication of Q and R.

* * * * *